(12) United States Patent
Vive et al.

(10) Patent No.: US 12,203,417 B2
(45) Date of Patent: Jan. 21, 2025

(54) FREE TURBINE TURBOMACHINE COMPRISING EQUIPMENT DRIVEN BY THE FREE TURBINE

(71) Applicant: SAFRAN HELICOPTER ENGINES, Bordes (FR)

(72) Inventors: Loïs Pierre Denis Vive, Moissy-Cramayel (FR); Thomas Drouin, Moissy-Cramayel (FR); Olivier Bedrine, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 57 days.

(21) Appl. No.: 18/251,025

(22) PCT Filed: Oct. 21, 2021

(86) PCT No.: PCT/FR2021/051849
§ 371 (c)(1),
(2) Date: Jul. 6, 2023

(87) PCT Pub. No.: WO2022/090650
PCT Pub. Date: May 5, 2022

(65) Prior Publication Data
US 2023/0366354 A1    Nov. 16, 2023

(30) Foreign Application Priority Data

Oct. 29, 2020    (FR) ........................................ 2011081

(51) Int. Cl.
*F02C 7/275*    (2006.01)
*F01D 15/10*    (2006.01)
*F02C 7/32*    (2006.01)

(52) U.S. Cl.
CPC .............. *F02C 7/275* (2013.01); *F01D 15/10* (2013.01); *F02C 7/32* (2013.01); *F05D 2220/76* (2013.01); *F05D 2260/85* (2013.01)

(58) Field of Classification Search
None
See application file for complete search history.

(56) References Cited

U.S. PATENT DOCUMENTS 4,044,552 A * 8/1977 West .......................... F02C 7/36
60/39.24
4,640,091 A * 2/1987 Blizzard ............... F01D 17/105
60/795

(Continued)

FOREIGN PATENT DOCUMENTS

FR    2929324 A1    10/2009
FR    3019220 A1    10/2015
FR    3081150 A1    11/2019

OTHER PUBLICATIONS

French Search Report issued in French Application No. 2011081 on Jun. 29, 2021.

(Continued)

*Primary Examiner* — Ehud Gartenberg
*Assistant Examiner* — Jacek Lisowski
(74) *Attorney, Agent, or Firm* — Bookoff McAndrews, PLLC (57) ABSTRACT

Disclosed is a turbomachine, comprising a gas generator (13) equipped with a first shaft (18), at least one reversible electrical machine (11), a free turbine (12) provided with a second shaft (17) and caused to rotate by a gas flow generated by the gas generator (13), an accessory gear box (14) and at least one accessory (15, 16).
Said at least one electrical machine (11) is mechanically coupled to said second mechanical shaft (17) via the accessory gear box (14) during all phases of operation of the (Continued)

turbomachine (10), the accessory gear box (14) is coupled to the at least one accessory (15, 16) and the turbomachine (10) further comprises a single mechanical coupling means (20) for mechanically coupling said first mechanical shaft (18) to the accessory gear box (14) in a first configuration and mechanically uncoupling said first mechanical shaft (18) from the accessory gear box (14) in a second configuration.

9 Claims, 4 Drawing Sheets

(56) References Cited

U.S. PATENT DOCUMENTS

| | | | |
|---|---|---|---|
| 7,513,120 B2 * | 4/2009 | Kupratis | F02C 3/113 60/788 |
| 9,297,314 B2 * | 3/2016 | Cloft | F01D 17/105 |
| 11,754,115 B1 * | 9/2023 | Belanger | F16C 33/121 415/200 |
| 11,939,072 B2 * | 3/2024 | Gomez | B64D 31/02 |
| 2014/0119891 A1 * | 5/2014 | Schmittenberg | F02C 7/05 415/121.2 |
| 2016/0097328 A1 | 4/2016 | Wintgens et al. | |
| 2017/0074169 A1 * | 3/2017 | Waissi | F02C 7/275 |
| 2017/0241347 A1 | 8/2017 | Marconi et al. | |
| 2018/0135522 A1 * | 5/2018 | Mitrovic | F02C 3/04 |
| 2019/0002113 A1 * | 1/2019 | Gansler | F01D 15/10 |
| 2020/0331621 A1 * | 10/2020 | Gomez | B64D 35/02 |
| 2020/0355122 A1 * | 11/2020 | Foutch | B64D 35/02 |

OTHER PUBLICATIONS

International Search Report and Written Opinion issued in International Application No. PCT/FR2021/051849 on Feb. 16, 2022.

* cited by examiner

PRIOR ART

FIG.1

PRIOR ART

FREE TURBINE TURBOMACHINE COMPRISING EQUIPMENT DRIVEN BY THE FREE TURBINE

CROSS-REFERENCE TO RELATED APPLICATIONS

This is a National Stage Application under 35 U.S.C. § 371 of International Application No. PCT/FR2021/051849, filed Oct. 21, 2021, now published as WO 2022/090650 A1, which claims priority to French Patent Application No. 2011081, filed on Oct. 29, 2020, the entireties of which are incorporated herein by reference.

TECHNICAL FIELD

The present invention relates to the general field of aeronautical free turbine turbomachines, in particular for turbogenerators, and more particularly with an architecture of such a turbomachine enabling the driving of equipment via the free turbine without compromising the operation of the equipment during start-up of the turbomachine.

PRIOR ART

A free turbine turboshaft engine for a helicopter generally comprises a gas generator and a free turbine caused to rotate by the gas flow generated by the gas generator, as well as a reversible electrical machine which can be coupled to the gas generator, in particular in order to rotate the gas generator during a start-up phase of the turboshaft engine.

Conventionally, the gas generator includes at least one compressor and a turbine coupled in rotation. The operating principle is as follows: fresh air entering into the turboshaft engine is compressed due to the rotation of the compressor before being sent to a combustion chamber where it is mixed with a fuel. The gases burned during the combustion are then evacuated at high speed.

There is then a first expansion in the turbine of the gas generator, during which the latter takes the energy necessary for driving the compressor and the equipment. The turbine of the gas generator does not absorb all the kinetic energy of the burned gases and the excess kinetic energy corresponds to the gas flow generated by the gas generator. This therefore provides the kinetic energy to the free turbine so that it produces a second expansion in the free turbine which transforms this kinetic energy into mechanical energy in order to drive a receiving member, such as the rotor of the helicopter.

During the start-up phase of the turboshaft engine, it is necessary to rotate the gas generator, in other words to rotate the compressor coupled to the turbine, as well as the various pieces of equipment which are connected to it. As mentioned in the preamble, this is precisely one of the roles of the reversible electrical machine which is most often an electric motor that is able to operate reversibly as an electrical generator.

Figure 1:
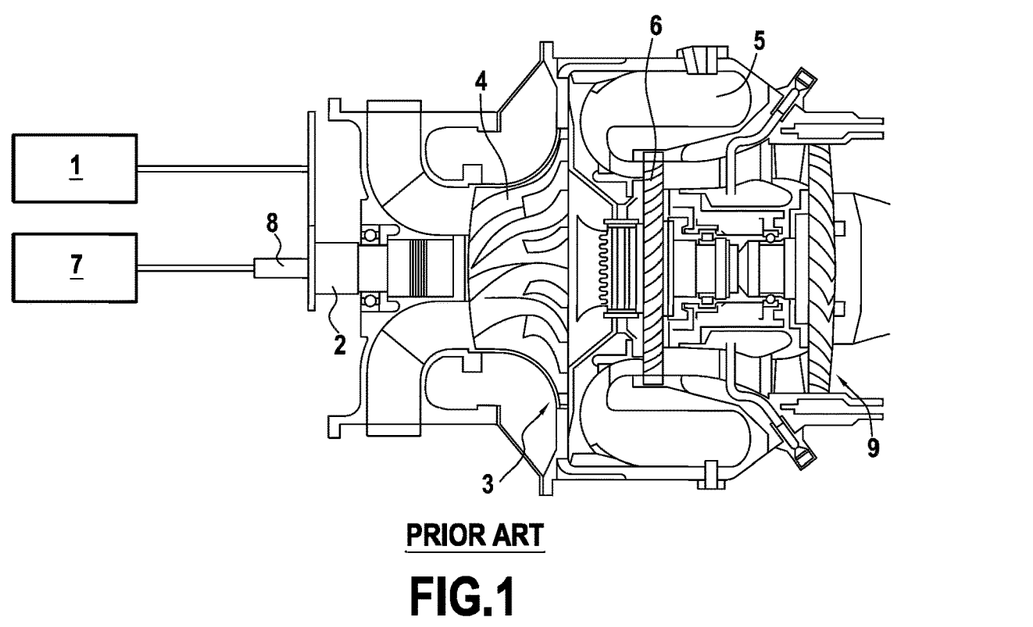
FIG. 1, already described, is a simplified schematic view of a free turbine turbomachine according to the prior art.

As illustrated in FIG. 1, which schematically shows a free turbine turbomachine according to the prior art, for the start-up, in a motor operation an electrical machine 1 drives the mechanical shaft 2 of the gas generator 3, until the rotation thereof is maintained by the fuel combustion. The rotating of the shaft of the gas generator by the reversible electrical machine, operating in motor mode during the start-up phase, can also drive the equipment, not shown in this figure, which can be driven by the shaft 2 via an accessory gear box. This makes it possible to supply the turbomachine with fuel and oil, and to circulate the air in the compressor 4 and therefore to bring compressed air into the combustion chamber 5 in order to initiate the combustion. This combustion then produces the gas flow for rotating the turbine 6 of the gas turbine 3, after which the compressor 4 and the equipment are rotated by the turbine 6 without the aid of the electrical machine, which signifies that the gas generator 3 is operating autonomously, reflecting the end of the start-up phase of the turboshaft engine.

In addition, for a turbogenerator as illustrated in FIG. 1, a second electrical machine 7 engaging on the shaft 8 of the free turbine 9 enables it to meet the need for high-power generation.

It is known that aircraft in which such turboshaft engines, in particular, are intended to be incorporated, include many electrical components which need to be supplied with electrical power. For example, for a vertical take-off and landing aircraft with electric propulsion, it is necessary to supply electrical power to all of the electric rotors which equip it.

On a turbomachine as illustrated in FIG. 1, the equipment such as the fuel pump and the oil pump, are mechanically connected to the shaft 2 of the gas generator 3 via the accessory gear box.

The equipment which requires taking mechanical energy in order to be rotated, for example pumps, are also called accessories and are generally mounted on an accessory gear box which comprises at least one gear train in order to adjust the speed of rotation of the accessories.

Once the start-up phase is terminated, it is known to use the reversible electrical machine in a generator operating mode in order to produce non-propulsive electrical power (28V grid, for example) in order to supply electricity to the electrical appliances. The electrical machine 1 generates electrical power by taking mechanical power from the shaft 2 of the gas generator 3, the kinetic energy of rotation taken from the gas generator being transformed into electrical energy by said machine.

This electrical machine 1 can be non-reversible and consist of a simple starter, such as a starter motor, if there is no need for electrical generation.

Figure 2:
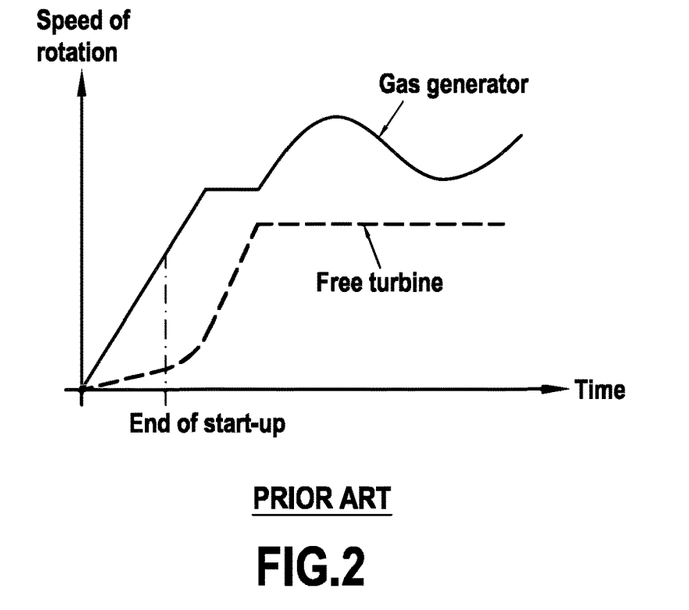
FIG. 2, already described, is a graphical representation of the evolution, as a function of time and of the possible configuration of the turbogenerator, of the speed of the shaft of the gas generator and of the speed of the shaft of the free turbine of the turbomachine of FIG. 1.

FIG. 2 shows the evolution as a function of time and of the possible configuration of the turbogenerator, of the speed of the shaft 2 of the gas generator 3 as a solid line, and of the speed of the shaft 8 of the free turbine 9 as a dashed line. It can be seen that the evolution of the speed of the two shafts is independent. The point of exit from the start-up phase is also indicated.

For a turboshaft engine, with a free turbine and a conventional start-up system using a reversible electrical machine, the taking of mechanical power from the shaft of the gas generator being used to generate the electrical power by the reversible electrical machine 1 in a generator operating mode, affects the performance of the gas generator.

Indeed, the variation, during flight, of the mechanical power taken by the electrical machine 1 and the equipment from the gas generator, results in a movement of the operating line of the engine in the compressor field. This movement corresponds to a pumping margin which must be provided, which results in:
- penalising the optimisation of the engine operating line, by prohibiting the use of the compressor at an optimum pressure level;
- degrading, thereby, the stabilised performance, with an impact on the specific consumption.

With such a configuration, a solution for not taking mechanical power from the generator shaft in order to generate electricity consists in using an electrical machine for the start-up function with a clutch-release system, and another electrical machine integral with the free turbine shaft for the generation function as illustrated in FIG. 1, which is penalising in terms of weight and cost, as well as being rarely used in practice.

A known architecture allowing start-up of a free turbine turbogenerator without the addition of a specific starter is disclosed in document FR 2 929 324. This technical solution makes it possible to reduce the total weight and cost, and to increase the reliability of the turbogenerator compared with a turbomachine comprising two electrical machines as in FIG. 1. The technical solution described in this document consists of a switching system using two free wheels enabling start-up of the gas generator of a free turbine turboshaft engine, then generating the non-propulsive electrical power by taking mechanical energy from the free turbine shaft. The equipment remains driven via the gas generator and the accessory gear box.

This solution makes it possible, in particular, to improve the transient performance of the gas generator by avoiding the disadvantages of taking kinetic energy from the gas generator and, in particular, the problem of movement of the operating line of the engine in the compressor field due to the variation, during flight, of the mechanical power taken by the electrical machine.

This architecture with two free wheels is advantageous in the context of a helicopter turbomachine, in order not to drive the main rotor via the electrical machine during the start-up phase. Indeed, since the free turbine of the turbomachine is mechanically connected to the main rotor, a coupling between the shaft of the free turbine and the main rotor which could not be uncoupled during the start-up phase would require oversizing at least the energy storage system in order that the electrical machine has sufficient energy to be able to rotate the entire kinematic chain (including the main rotor).

However, such a system is not suitable in the case of a free turbine turbogenerator for an electrically-driven rotary wing aircraft, in which the shaft of the free turbine is not coupled to a rotor of the rotary wing of the aircraft. In other words, such a system is relatively too heavy and complex for a free turbine turbogenerator in which the inertia of the free turbine shaft line is generally low.

In order to improve the performance of the free turbine turbomachine, it would also be advantageous to be able to drive all of the equipment of the turbomachine via the free turbine. However, since the performance of the fuel pump is associated with its speed of rotation, the evolution of the speed of the free turbine after the start-up phase would not allow, or would strongly impact, the design of the fuel system assembly in order to guarantee a correct start-up of the turbomachine.

DISCLOSURE OF THE INVENTION

For this purpose, the present invention proposes a free turbine turbomachine driving one or more electrical machines of sufficient power, equipped with a simplified switching system enabling weight, cost and reliability to be optimised.

In an object of the invention, a turbomachine is disclosed, comprising a gas generator equipped with a first mechanical shaft, at least one reversible electrical machine, a free turbine equipped with a second mechanical shaft and caused to rotate by a gas flow generated by the gas generator, an accessory gear box and at least one accessory coupled to the accessory gear box.

According to a technical feature of the invention, the electrical machine is mechanically coupled to said second mechanical shaft via the accessory gear box during all the phases of operation of the turbomachine, and the turbomachine further comprises a single mechanical coupling means for mechanically coupling said first mechanical shaft to the accessory gear box in a first configuration and mechanically uncoupling said first mechanical shaft from the accessory gear box in a second configuration, the electrical machine being sized in order to drive the gas generator, the free turbine and said at least one accessory during start-up of the turbomachine.

The turbomachine according to the invention, comprising an electrical machine and a single free wheel, thus makes it possible to use the electrical machine mutually for the start-up function of the gas generator and for high-power electrical generation, and enables the free turbine to drive the accessories once the turbomachine is started up. Indeed, it makes it possible to simultaneously initiate the rotation of the accessories, the free turbine and the gas generator, until the gas generator can operate autonomously, then to continue to drive the free turbine and the accessories until the free turbine can also operate autonomously. Once the free turbine is in autonomous rotation, the electrical machine can operate in generator mode and thus supply electrical power to other elements.

The architecture of the turbomachine according to the invention thus makes it possible to have only a single mechanical coupling means, such as a free wheel, which makes it possible to simplify the switching system and in particular, in comparison with known solutions, to reduce the weight and the cost.

In a turbogenerator application of the turbomachine, the one or more electrical machines are sized to generate high levels of electrical power (for example for the propulsive power), and can, when they are used in motor mode, easily deliver the torque necessary for driving the gas generator, the free turbine and the equipment during the start-up phase. Indeed, in such applications, the inertia of the free turbine shaft line is low because it is not coupled to a helicopter rotor, for example (power chain and rotors of electrical machines only).

In addition, the architecture according to the invention makes it possible, in the event that the free turbine shaft breaks during operation, to directly impact the driving of the accessories (including the fuel pump) having the direct effect of instantly switching off the motor and therefore limiting the overspeed of the free turbine. This architecture has the effect of protecting the free turbine in overspeed.

According to a first aspect of the turbomachine, the turbomachine can further comprise a control unit of the electrical machine, the control unit being configured to place the electrical machine in motor mode during start-up of the turbomachine, and to place the electrical machine in generator mode when the speed of the first mechanical shaft exceeds a speed threshold for exit from the start-up phase.

By decoupling the gas generator from the accessory gear box once the gas generator has reached a speed enabling its autonomous operation, the electrical energy to be delivered by the electrical machine (until autonomous operation of the free turbine) is reduced since the amount of energy necessary now only corresponds to that for driving the free turbine and the accessories.

The transition phase between the autonomous operation of the gas generator and the autonomous operation of the free turbine, during which the electrical machine continues to operate in motor mode, but only for the accessories and the free turbine, thus makes it possible to keep the speed of rotation of the equipment, or accessories, sufficiently high to guarantee their correct operation.

According to a second aspect of the turbomachine, the electrical machine can be configured to operate in motor mode from the start-up phase of the turbomachine and until the operating parameters of the second mechanical shaft or said electrical machine have exceeded a threshold at which the free turbine is said to be autonomous. The value of the operating parameter corresponding to the threshold at which the free turbine is autonomous is preferably greater than the value that said operating parameter has when the first shaft reaches the speed threshold for exit from start-up phase. In other words, the threshold at which the free turbine is autonomous arrives after the time when the gas generator has become autonomous. The electrical machine is configured to operate in generator mode once said parameter of the second mechanical shaft or of the electrical machine has exceeded the threshold at which the free turbine is autonomous.

The start-up phase and transition phase can be produced by controlling the torque or the speed. An operating parameter of the second mechanical shaft may be its speed or its mechanical torque.

According to a third aspect of the turbomachine, the control unit is configured to control the electrical machine in motor mode:
- as a function of the speed of rotation of the first and second mechanical shafts from the starting of the turbomachine until the ignition of the gas generator, then
- as a function of the level of torque required to drive the first and second mechanical shafts until the gas generator operates autonomously, then
- as a function of the speed of rotation of the first and second mechanical shafts until said parameter of the second mechanical shaft has exceeded a threshold at which the free turbine is autonomous.

The control unit controls the electrical machine while interacting with the computer of the turbomachine.

The speed control before the detection of ignition makes it possible to remain in the preferred ignition window, in other words the speed interval in which the chances of successful ignition are the highest.

The speed control during the transition phase, in other words after uncoupling of the gas generator and before the passage into generator mode of the electrical machine, makes it possible to maintain a constant speed during the transition, by compensating for the variation in torque on the accessories coupled to the accessory gear box.

The torque supplied by the electrical machine during the transition phase will reduce, until it is eventually cancelled out, as the torque delivered by the free turbine increases.

According to a fourth aspect of the turbomachine, the mechanical coupling means can comprise a free wheel.

According to a fifth aspect of the turbomachine, the coupling means can be contained in a casing of the accessory gear box.

The pinions of the accessory gear box thus make it possible to adjust the speeds for the equipment, such as a fuel pump or an oil pump, mechanically coupled to the first mechanical shaft, in other words to the gas generator, but also ensures that, from the start-up phase, the input speed of the free wheel, in other words on the mechanical terminal of the free wheel coupled to the second mechanical shaft, is always less than the output speed of the free wheel, in other words on the mechanical terminal of the free wheel coupled to the first mechanical shaft. This is the case over the entire nominal operating range of the gas generator and of the free turbine, thus outside of the start-up phase.

According to a seventh aspect of the turbomachine, the accessory gear box can be configured to change the gear ratio between the free turbine and the gas generator, when the mechanical coupling means is in its first configuration.

According to a seventh aspect of the turbomachine, the accessory gear box can be arranged and connectable between the mechanical coupling means and the second mechanical shaft.

The accessory gear box makes it possible to change the gear ratio by taking into account the sign of the ratio, in other words by offering the possibility of ensuring the ability of the two shafts to counter-rotate, while ensuring the incorporation of secondary functions.

This configuration makes it possible to improve the efficiency of the ventilation after engine shut-down, the two shafts being simultaneously driven.

According to a seventh aspect of the turbomachine, the turbomachine can further comprise an additional accessory gear box connected to the first shaft in order to permanently couple additional accessories directly to the gas generator.

DESCRIPTION OF THE EMBODIMENTS

Figure 3:
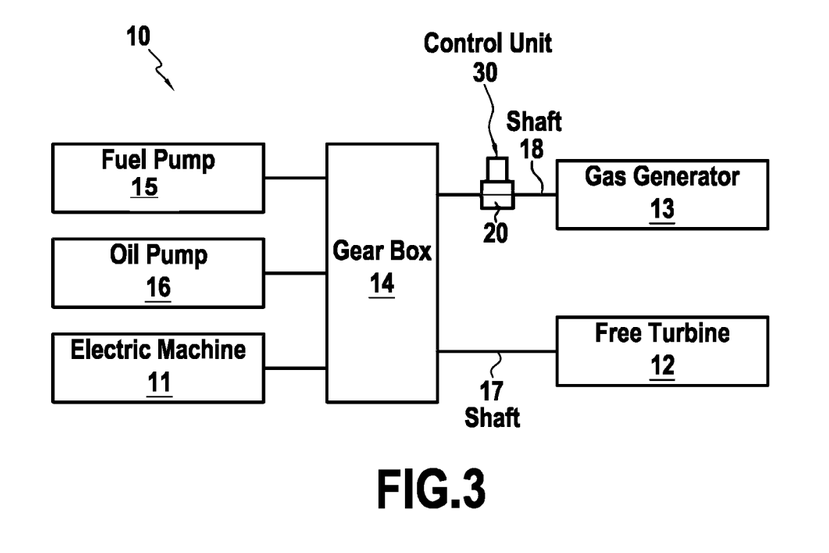
FIG. 3 is a diagram of a free turbine turbomachine according to an embodiment of the invention.

FIG. 3 schematically shows a free turbine turbomachine 10 according to an embodiment of the invention.

The turbomachine 10 comprises an electrical machine 11, a free turbine 12, a gas generator 13, an accessory gear box 14, a fuel pump 15 and an oil pump 16.

The free turbine 12 comprises a shaft 17 permanently mechanically connected to the accessory gear box 14. The accessory gear box 14 is mechanically coupled to the electrical machine 11. Hence, the kinematic chain between the electrical machine 11 and the free turbine 12 does not comprise any uncoupling device, which thus makes it possible to have the turbine 12 coupled to the electrical machine 11 during all the phases of operation of the turbomachine 10, in particular during the start-up phase and the electrical generation phase.

The accessory gear box 14 is likewise mechanically coupled to both the fuel pump 15 and to the oil pump 16. In other embodiments, other accessories can be mechanically coupled to the accessory gear box 14.

The gas generator 13 comprises a shaft 18 connected and mechanically coupled to the accessory gear box 14 via a single mechanical coupling means 20. The single mechanical coupling means 20 is configured for mechanically coupling the shaft 18 of the gas generator 13 to the accessory gear box 14 in a first configuration, and for mechanically uncoupling from the accessory gear box 14 in a second configuration in order, in particular, to uncouple the shaft 18 of the gas generator from the shaft 17 and the electrical machine 11. The shaft 18 of the gas generator 13 is thus selectively coupled to the electrical machine 11 via the accessory gear box 14.

The mechanical coupling means 20 comprises a free wheel.

The turbomachine 10 further comprises a control unit 30 of the electrical machine 11, configured to place the electrical machine 11 in motor mode during a start-up phase of the turbomachine 10, and to place the electrical machine 11 in generator mode when it is detected that the free turbine can operate autonomously.

The coupling means 20 are mechanically configured to have the electrical machine 11 mechanically coupled to the gas generator 13 via the shaft 18 during the start-up of the turbomachine 10.

In addition, the coupling means 20 is mechanically configured for uncoupling the gas generator from the electrical machine 11 once the gas generator 13 reaches a speed threshold for exit from the start-up phase.

Figure 6:
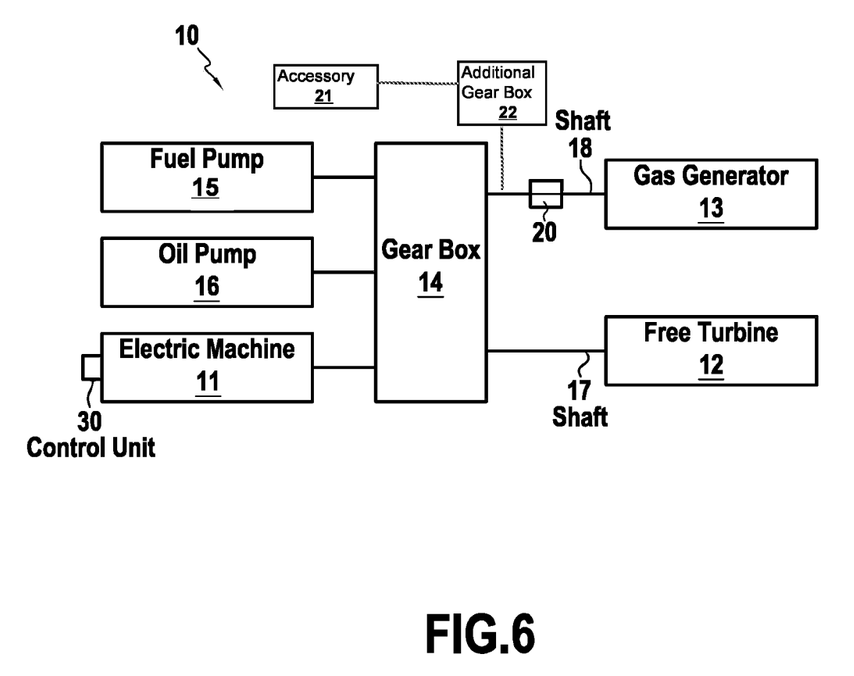
FIG. 6 is a diagram of a free turbine turbomachine according to another embodiment of the invention.

Moreover, as shown in FIG. 6, the turbomachine can further comprise an additional accessory gear box 22 connected to the first shaft 18 in order to permanently couple additional accessories 21 directly to the gas generator 13.

Figure 4:
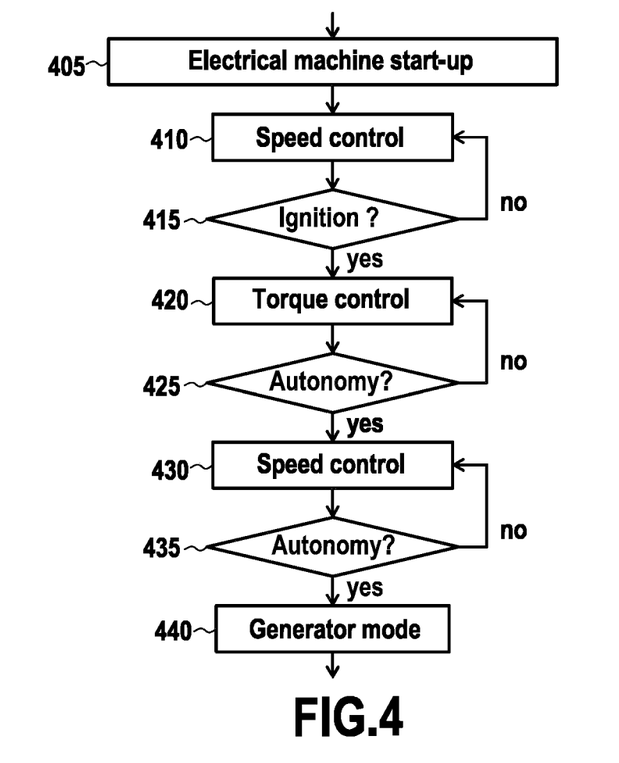
FIG. 4 shows a logic diagram of a method for controlling the start-up of the turbomachine of FIG. 3 according to an embodiment.

FIG. 4 shows a logic diagram of a method for controlling the start-up of the turbomachine 10 according to an embodiment of the invention.

Figure 5:
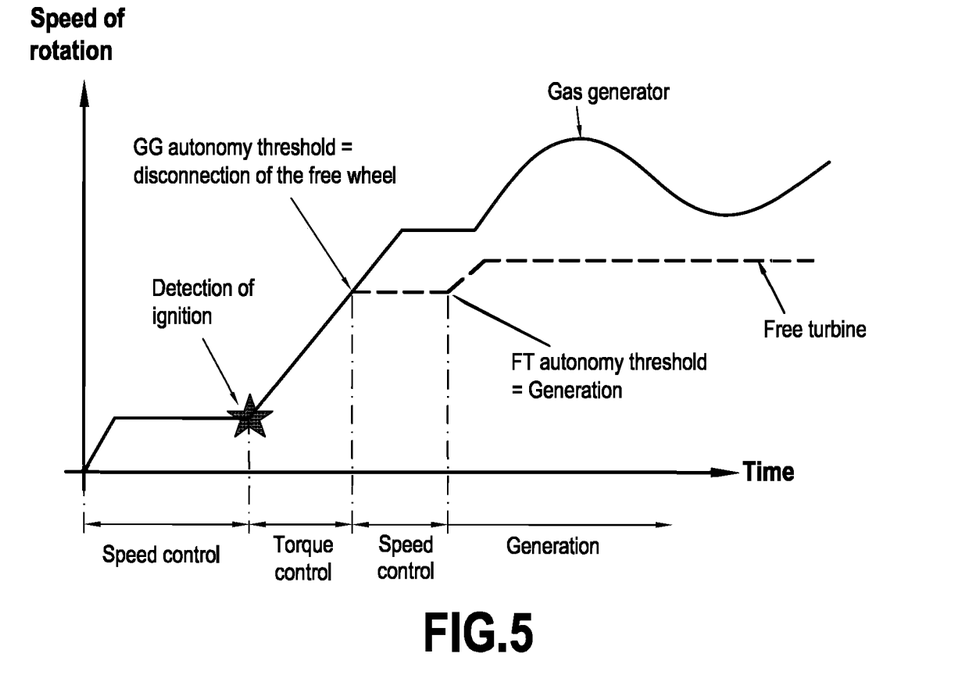
FIG. 5 is a graphical representation of the evolution, as a function of time and of the possible configuration of the turbogenerator, of the speed of the shaft of the gas generator and of the speed of the shaft of the free turbine of the turbomachine of FIG. 3.

FIG. 5 graphically shows the evolution as a function of time and of the possible configuration of the turbogenerator, of the speed of the shaft 18 of the gas generator 13 as a solid line and, as a dashed line, the speed of the shaft 17 of the free turbine 12 of the turbomachine 10 of FIG. 3 during its start-up using the method of FIG. 4.

The start-up method of the turbomachine 10 comprises a first step 405 in which the electrical machine 11 is placed in motor mode and started in order to begin rotation of the shafts 17 and 18 of the free turbine 12 and of the gas generator 13 via the accessory gear box 14. Indeed, during the rotating of the accessory gear box 14 by the electrical machine 11, the mechanical coupling means 20, which may be a free wheel, automatically transmits the torque required for rotating the gas generator 13. Starting from the start-up of the electrical machine 11 in the first step 405, the electrical machine 11 is controlled, for example, by the control unit 30, then in a second step 410 as a function of the speed of rotation of its mechanical shaft coupled to the accessory gear box 14, in order that the speed of rotation of the shaft 17 of the gas generator 13 remains in the ignition window, in other words in a specified speed range for maximising the chances of successful ignition of the gas generator combustion chamber. For this control, the control unit 30 can comprise an electronic processing unit such as a computer and receive information on the speed of the shaft of the electrical machine 11 or the shaft 17 of the gas generator 13, these two speeds being proportional to one another with a reduction factor specific to the gear train of the accessory gear box 14.

In a third step 415, it is checked whether the combustion chamber of the gas generator 13 is ignited. So long as the ignition of the gas generator 13 is not detected, the speed control of the electrical machine 11 is maintained.

On the other hand, once the ignition of the gas generator 13 is detected in step 415, then in a fourth step 420 the torque of the electrical machine 11 is controlled according to a predefined curve of the torque as a function of the speed of rotation of the electrical machine 11.

In a fifth step 425, the speed of rotation of the shaft 18 of the gas generator is compared with a threshold for autonomous operation of the gas generator. The threshold for autonomous operation of the gas generator 13 is defined, for example, with respect to the value of the speed of rotation at which the gas generator can operate autonomously. As long as the speed of rotation of the shaft 18 of the gas generator 13 has not reached a value corresponding to the threshold for autonomous operation of the gas generator 13, the torque control of the electrical machine 11 continues to be performed in the fourth step 420.

On the other hand, once the threshold is reached, then in a sixth step 430, the electrical machine 11 is speed controlled according to a threshold enabling the correct operation of the accessories such as the fuel pump 15 and the oil pump 16, and limiting the electrical power taken from the grid.

In a seventh step 435, a comparison is made, for example, between the level of torque delivered by the electrical machine and/or its speed of rotation at a corresponding threshold, at which the free turbine can operate autonomously, in other words at which the flow delivered by the gas generator 13 is sufficient to cause the rotation of the free turbine 12 or to accelerate it. So long as the power available on the free turbine 12 does not allow the torque delivered by the electrical machine to be reduced, enabling its setpoint speed to be maintained, or so long as there is no positive change to the speed of rotation, the control of the electrical machine 11 continues to be performed as a function of the speed setpoint in the sixth step 420.

On the other hand, once the threshold is reached, in an eighth step 440, the electrical machine 11 changes operating mode. The electrical machine 11 switches from motor mode to generator mode.

Hence, the electrical machine 11 can operate as an electric generator and produce electrical power from the rotation of the shaft 17 of the free turbine driven by the rotary movement of the free turbine 12, itself driven by the gas flow delivered by the gas generator 13.

The transition phase between the autonomous operation of the gas generator 13 and the autonomous operation of the free turbine 12, during which the electrical machine 11 continues to operate in motor mode, but only to ensure the driving of the accessories and the free turbine 12, thus makes it possible to maintain a speed of rotation of the equipment or accessories that is sufficiently high to guarantee their correct operation.

The free turbine turbomachine according to the present invention thus makes it possible to optimise the weight, cost and reliability of the switching system and therefore of the turbomachine.

The invention claimed is:

1. A turbomachine comprising a gas generator equipped with a first mechanical shaft, at least one reversible electrical machine, a free turbine provided with a second mechanical shaft and caused to rotate by a gas flow generated by the gas generator, an accessory gear box, and at least one accessory coupled to the accessory gear box, wherein said at least one reversible electrical machine is mechanically coupled to the second mechanical shaft via the accessory gear box during all phases of operation of the turbomachine, and the turbomachine further comprises a single mechanical coupling means for mechanically coupling said first mechanical shaft to the accessory gear box in a first configuration and mechanically uncoupling said first mechanical shaft from the accessory gear box in a second configuration, wherein the accessory gear box is arranged between the single mechanical coupling means and the second mechanical shaft, and wherein the at least one reversible electrical machine is configured to cause the gas generator, as well as said at least one accessory and the free turbine, to rotate during start-up of the turbomachine.

2. The turbomachine according to claim 1, further comprising a control unit of said at least one reversible electrical machine, the control unit being configured to place the at least one reversible electrical machine in motor mode during start-up of the turbomachine, and to place the at least one reversible electrical machine in generator mode when it is detected that the free turbine can operate autonomously.

3. The turbomachine according to claim 2, wherein the at least one electrical machine is configured to operate in motor mode from the start-up phase of the turbomachine and until a mechanical parameter of the second mechanical shaft or of the at least one electrical machine has exceeded a threshold at which the free turbine is autonomous, the at least one electrical machine being configured to operate in generator mode once said parameter of the second mechanical shaft or of the at least one electrical machine has exceeded a threshold at which the free turbine is autonomous.

4. The turbomachine according to claim 3, wherein the control unit is configured to control the at least one electrical machine in motor mode:

as a function of a speed of rotation of the first and second mechanical shafts from starting of the turbomachine until ignition of the gas generator, then as a function of a level of torque required to drive the first and second mechanical shafts until the gas generator operates autonomously, then as a function of the speed of rotation of the first and second mechanical shafts until said parameter of the second mechanical shaft has exceeded a threshold at which the free turbine is autonomous.

5. The turbomachine according to claim 1, wherein the single mechanical coupling means comprises a free wheel.

6. The turbomachine according to claim 1, wherein the single mechanical coupling means is contained in a casing of the accessory gear box.

7. The turbomachine according to claim 1, wherein the accessory gear box is configured to change a gear ratio between the free turbine and the gas generator when the single mechanical coupling means is in its first configuration.

8. The turbomachine according to claim 1, wherein the accessory gear box is configured to be connected between the single mechanical coupling means and the second mechanical shaft.

9. The turbomachine according to claim 1, further comprising an additional accessory gear box connected to the first shaft for permanently coupling additional accessories directly to the gas generator.

* * * * *